United States Patent
Madsen

(10) Patent No.: US 12,305,804 B2
(45) Date of Patent: May 20, 2025

(54) MOBILE LUBRICATION PUMP AND METHODS FOR REGULATING PRESSURE OF THE SAME

(71) Applicant: Hove A/S, Glostrup (DK)

(72) Inventor: Ivan Madsen, Odense Sv (DK)

(73) Assignee: Hove A/S, Glostrup (DK)

( * ) Notice: Subject to any disclaimer, the term of this patent is extended or adjusted under 35 U.S.C. 154(b) by 244 days.

(21) Appl. No.: 17/782,021

(22) PCT Filed: Dec. 8, 2020

(86) PCT No.: PCT/EP2020/085068
§ 371 (c)(1),
(2) Date: Jun. 2, 2022

(87) PCT Pub. No.: WO2021/116100
PCT Pub. Date: Jun. 17, 2021

(65) Prior Publication Data
US 2023/0003341 A1  Jan. 5, 2023

(30) Foreign Application Priority Data
Dec. 9, 2019 (EP) .................................. 19214451

(51) Int. Cl.
| | |
|---|---|
| *F16N 29/02* | (2006.01) |
| *F16N 3/12* | (2006.01) |
| *G05B 19/042* | (2006.01) |
| *G05D 7/06* | (2006.01) |
| *H02P 27/08* | (2006.01) |

(52) U.S. Cl.
CPC ............... *F16N 29/02* (2013.01); *F16N 3/12* (2013.01); *G05B 19/042* (2013.01); *G05D 7/0676* (2013.01); *H02P 27/08* (2013.01); *F16N 2270/60* (2013.01)

(58) Field of Classification Search
CPC ........ F16N 29/02; F16N 3/12; F16N 2270/60; F16N 13/00; F16N 29/00; G05B 19/042; G05D 7/0676; H02P 27/08
See application file for complete search history.

(56) References Cited

U.S. PATENT DOCUMENTS 8,753,095 B2 *  6/2014  Bruce ................. F04D 15/0263
                                                      417/423.4
11,530,689 B2 *  12/2022  Madsen ............... G05D 7/0676
(Continued)

FOREIGN PATENT DOCUMENTS

| EP | 2573391 A1 | 3/2013 |
|---|---|---|
| EP | 3048356 A1 | 7/2016 |

(Continued)

*Primary Examiner* — Ramesh B Patel
(74) *Attorney, Agent, or Firm* — Dinsmore & Shohl LLP

(57) ABSTRACT

A mobile lubrication pump has a motor for driving the pump for producing a pump pressure, a pressure monitor for measuring the pump pressure, a motor controller for regulating the operation of the motor, and a data processing unit (DPU) for communicating with the motor controller, and for receiving: 1) input from the pressure monitor, and 2) user input related to pump capacity and/or lubrication target. The data processing unit is configured to determine and communicate a motor speed and/or motor torque to the motor controller based on the received input 1) and 2).

25 Claims, 3 Drawing Sheets

(56) References Cited

U.S. PATENT DOCUMENTS

| | | | |
|---|---|---|---|
| 11,940,094 B2* | 3/2024 | Lisby | F03D 80/70 |
| 2012/0132483 A1* | 5/2012 | Conley | F16N 7/38 |
| | | | 184/6.28 |
| 2012/0159939 A1* | 6/2012 | Xie | F16H 61/0025 |
| | | | 60/368 |
| 2012/0171049 A1* | 7/2012 | Paluncic | F16N 13/00 |
| | | | 417/32 |
| 2012/0241258 A1* | 9/2012 | Subramaniam | F16N 7/40 |
| | | | 184/6.4 |
| 2013/0074628 A1* | 3/2013 | Uusitalo | F16H 57/0435 |
| | | | 74/467 |
| 2013/0168187 A1* | 7/2013 | Conley | F16N 7/38 |
| | | | 184/6 |
| 2013/0168188 A1* | 7/2013 | Donovan | F16N 13/02 |
| | | | 184/6 |
| 2016/0169446 A1* | 6/2016 | Peters | H04B 5/77 |
| | | | 222/23 |
| 2016/0186740 A1* | 6/2016 | Klaphake | F16N 29/02 |
| | | | 417/45 |
| 2017/0173613 A1* | 6/2017 | Hove | F16N 5/00 |
| 2020/0049310 A1* | 2/2020 | Lisby | F16N 39/00 |
| 2020/0063719 A1* | 2/2020 | Madsen | F03D 80/70 |
| 2020/0103074 A1* | 4/2020 | Lisby | F04C 29/025 |
| 2023/0003341 A1* | 1/2023 | Madsen | F16N 29/02 |
| 2023/0021491 A1* | 1/2023 | Shook | F01D 21/003 |
| 2024/0189192 A1* | 6/2024 | Trevino | A61J 7/0076 |

FOREIGN PATENT DOCUMENTS

| | | | |
|---|---|---|---|
| WO | 2013034154 A1 | 3/2013 | |
| WO | 2018095780 A1 | 5/2018 | |

* cited by examiner

MOBILE LUBRICATION PUMP AND METHODS FOR REGULATING PRESSURE OF THE SAME

CROSS-REFERENCE TO RELATED APPLICATIONS

This application is the U.S. National Stage of PCT/EP2020/085068 filed on Dec. 8, 2020, which claims priority to European Patent Application 19214451.7 filed on Dec. 9, 2019, the entire content of both are incorporated herein by reference in their entirety.

FIELD OF THE INVENTION

The present invention relates to a mobile lubrication pump or dispensing station, and a method for regulating the pump pressure of a mobile lubrication pump.

BACKGROUND OF THE INVENTION

Periodical, and often frequent, lubrication is necessary for ensuring proper operation of most machines. The lubrication may be obtained via a stationary lubricator, integrated into the individual machine. Alternatively, the lubrication may be obtained via a mobile lubricator, which may service a multiple of machines. For example, a mobile lubricator may be portable or transportable, such that it is easily transported to/from different lubrication targets e.g. by a human.

A lubricator typically comprises a lubricant pump, which produces the pump pressure for dispensing the lubricant. In addition, the lubricator comprises a pump driver, e.g. a motor, and a pump driver controller, e.g. a motor controller. To ensure safe operation, a lubricator typically also comprises means for avoiding overpressures within the pump and/or the components of the pump, e.g. the tubes. For example, the lubricator may comprise a pressure release valve or safety valve. Alternatively, the lubricator may be restricted to operation at a lower capacity pressure and/or lower motor speed, such that the risk of detrimental overpressures are reduced. Further alternatively, the lubricator may comprise a pressure gauge for detecting a predetermined detrimental overpressure.

WO 2013/034154 discloses a mobile lubrication unit comprising a pump driven by a motor, a motor controller, and a pressure gauge. The motor controller controls the operation of the motor on the basis of input from the pressure gauge, such that at a predetermined, critical maximum pressure, the motor is stopped by the controller. The predetermined maximum pressure may be provided to the controller via an input panel.

To inspect and ensure sufficient lubrication of a lubrication target, e.g. a bearing, the bearing may be lubricated until a predetermined volume of lubricant/grease has been introduced and fresh grease emerges from the bearing vent, or a certain back pressure is measured. This method is also known as the grease purge and volume (GPV) method.

Different lubrication targets typically require different amounts of grease to ensure sufficient lubrication, and the different targets generate different back pressures and back pressure rates. Hence, a first bearing may require and tolerate a high lubricant pressure for efficient lubrication, and correspondingly generate a high back pressure, whereas a second bearing may only tolerate a low lubricant pressure for efficient lubrication. Thus, there may be a risk that the lubrication system can damage the second lubrication target if the lubrication pressure is not properly regulated.

To further improve the lubrication safety and efficiency, improved mobile lubricators are needed.

SUMMARY OF THE INVENTION

The present invention provides a mobile lubrication pump with improved safety and efficiency. High combined safety and efficiency is especially an issue for mobile lubricators, where the different lubrication targets require different lubrication pressures to obtain the most efficient lubrication, and where the different pumps tolerate different back pressures and overpressures.

A first aspect of the invention relates to a mobile lubrication pump, comprising:
 a motor for driving the pump for producing a pump pressure,
 a pressure monitor for measuring the pump pressure,
 a motor controller for regulating the operation of the motor,
 a data processing unit (DPU) for communicating with the motor controller, and for receiving: 1) input from the pressure monitor, and 2) user input related to: pump capacity and/or lubrication target, and
wherein the data processing unit is configured to determine and communicate a motor speed and/or torque to the motor controller based on the received input 1) and 2).

A second aspect of the invention relates to a method for regulating the pump pressure of a mobile lubrication pump, comprising the steps of:
 providing a mobile lubrication pump comprising a motor,
 providing at least one condition parameter via a communication device, wherein the condition parameter is related to: pump type, lubrication target, pump pressure, pump speed, and/or pump flow rate,
 measuring the pump pressure,
 determining and regulating the speed and/or torque of the motor based on the input in b) and c).

In a preferred embodiment, the method is a computer implemented method.

BRIEF DESCRIPTION OF THE DRAWINGS

The invention will in the following be described in greater detail with reference to the accompanying drawings, in which.

DETAILED DESCRIPTION OF THE INVENTION

Figure 1:
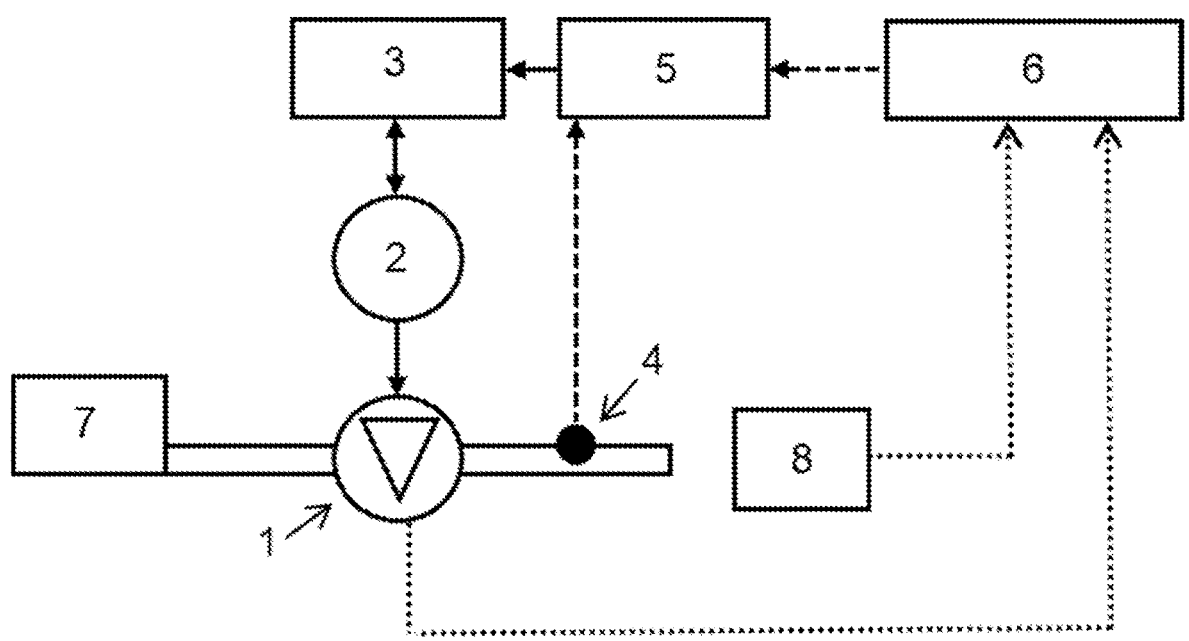
FIG. 1 shows a diagram of an embodiment of a mobile lubrication pump according to the present disclosure.

The invention is described below with the help of the accompanying figures. It would be appreciated by the people skilled in the art that the same feature or component of the device are referred with the same reference numeral in different figures. A list of the reference numbers can be found at the end of the detailed description section.

FIG. 1 shows an embodiment of a mobile lubrication pump or dispensing station according to the present disclosure for dispensing a lubricant or grease from a container 7 to a lubrication site or more specifically a lubrication target 8. Examples of a lubrication target include a bearing, a chain, a grease fitting, and a grease nipple. A lubrication target may also be referred to as a lubrication point or lube point. The system comprises a pump 1 mechanically connected to a motor 2 for driving the pump, and where the motor operation is regulated by a motor controller 3. The system further comprises a pressure monitor 4 for measuring the pump pressure, and a data processing unit (DPU) 5 for communicating with the motor controller and for receiving input from the pressure monitor. The DPU is further configured for receiving a user input, e.g. via a user interface 6, where the user input is related to the pump capacity and/or the lubrication target.

Advantages

To obtain a fast lubrication process, it is advantageous to operate the mobile lubrication pump at maximum capacity, e.g. at maximum pressure. However, to protect the lubrication target and the maintenance of the pump and parts thereof, a lower pressure is typically required.

Different lubrication targets typically require different amounts of grease to ensure sufficient lubrication. Also, different lubrication targets generate different back pressures and back pressure rates. Hence a first bearing may require and tolerate a high lubricant pressure for efficient lubrication, and correspondingly generate a high back pressure, whereas a second bearing may only tolerate a low lubricant pressure for efficient lubrication.

When using mobile lubrication pumps, there is a particularly high risk of exposing a lubrication target to inefficient lubrication. For example, to protect the lubrication target and to reduce the risk of exposing the target to an intolerable high pressure, the pump operation is typically set to a safe value, below the maximum pump capacity and below the maximum tolerable lubricant pressure at the specific target. In addition, or alternatively, manual supervision and control is used to reduce the risk of intolerable high pressures, as well as reducing the risk of too low pressures and consequently slow lubrication processes.

Different pumps will have different pump capacity, i.e. different target capacity or optimum capacity, where it operates most efficiently for producing a pump pressure for dispensing a lubricant. Hence, by the term "pump capacity" is meant the target load for a pump during operation, where it operates most efficiently.

Furthermore, the pump capacity or target capacity will depend on the back pressure. Hence, at no/low back pressure, the pump capacity/target capacity will be higher than at a high back pressure. The pump capacity may be unambiguously determined by the pump type and/or pump parameters such as the target pump pressure, the target pump speed, and/or the target pump flow rate. The pump parameters are interrelated. Hence a target pump speed may be converted into an equivalent maximum pump pressure. Similarly, a target pump flow rate may be converted into an equivalent maximum pump pressure.

When using mobile lubrication pumps, there is a particularly high risk of using the pump at overload or underload, i.e. respectively operation above the pump capacity/target capacity or below the pump capacity/target capacity. For example, if the lubrication target tolerates high lubricant pressures, the pump may be overloaded due to the high back pressure, or if the lubrication target tolerates low lubricant pressure, the pump may be under loaded to ensure protection of the lubrication target.

It was found that a more efficient lubrication process may be obtained if the pump operation is regulated based on the measured pump pressure relative to a given pump capacity and/or lubrication target.

In an embodiment of the disclosure, the mobile lubrication pump, comprises:

a motor for driving the pump for producing a pump pressure,
a pressure monitor for measuring the pump pressure,
a motor controller for regulating the operation of the motor,
a data processing unit (DPU) for communicating with the motor controller, and for receiving: 1) input from the pressure monitor, and 2) user input related to: pump capacity and/or lubrication target, and wherein the data processing unit is configured to determine and communicate a motor speed and/or torque to the motor controller based on the received input 1) and 2).

In a further embodiment, the pump capacity is determined by pump type, pump pressure, pump speed, and/or pump flow rate.

Data Processing Unit (DPU)

Advantageously, the operation of the pump is regulated via a motor controller in communication with a data processing unit (DPU). The DPU is capable of receiving (1) input from a pressure monitor registering the pump pressure, as well as (2) input from a user relating to the pump capacity and/or lubrication target. Based on input (1) and (2), the DPU may determine or calculate a desired target motor speed, which is the motor speed corresponding to the target pump capacity at the measured pressure and/or the corresponding tolerable lubricant pressure at the lubrication target.

Hence, the DPU determines a desired target motor speed, which is different from zero. For example, if the measured pressure (1) is higher than the equivalent pump capacity known from (2) at the measured pressure, the calculated target motor speed and/or torque will be reduced. Correspondingly, if the measured pressure (1) is lower than the equivalent pump capacity known from (2) at the measured pressure, the calculated target motor speed and/or torque will be increased. Specifically, this has the advantage that the risk of overloading the pump or parts thereof is avoided. For a conventional pump controller, if the measured pressure is high, the motor speed is not regulated, resulting in risk of overpressure or overload of the pump. However, for the present disclosure, a high measured pressure is instead compensated by regulating the speed such that the back pressure is reduced, which facilitates a more efficient lubrication and pump operation.

Advantageously, the DPU is configured for continuously receiving input from the pressure monitor, such that the desired target motor speed may be known at any point of time during operation, thereby enabling the most efficient operation of the pump. Further advantageously, the DPU is configured for minimising the difference between inputs (1) and (2), which is advantageously obtained in a closed feedback loop.

In an embodiment of the disclosure, the DPU is configured for continuously receiving input from the pressure monitor. In a further embodiment, the DPU is configured for minimising the difference between inputs 1) and 2). In a further embodiment, the DPU is configured for minimising the difference in a closed feedback loop.

Motor Controller

Advantageously, the DPU continuously communicates the calculated target motor speed and/or torque to the motor controller, which thereby regulates the motor speed and/or torque to the desired target motor speed. The motor controller may be configured for regulating the operation of the motor continuously, thereby enabling continuous and efficient operation of the pump. Alternatively, or in combination, the motor controller may be configured for regulating the operation of the motor discontinuously, e.g. the motor may be stopped and subsequently restarted at the desired target motor speed after a predetermined amount of time. Preferably, the motor is restarted after a predetermined amount of time, such that equilibration of pump system is obtained before restart.

In an embodiment of the disclosure, the motor controller is configured for regulating the operation of the motor continuously. In another embodiment, the motor controller is configured for regulating the operation of the motor discontinuously.

The speed and/or torque of the motor may be regulated by use of different means. For example, the speed of a motor may be regulated by changing the motor rotations per time unit, whereby the motor operation is regulated. For an electric motor, the motor torque is regulated by changing the power supplied to the electric motor, whereby the motor operation is regulated.

In an embodiment of the disclosure, the motor controller is configured for regulating the motor speed and/or motor torque.

To improve the cost efficiency of the mobile pump, the mobile pump advantageously comprises as few parts as possible. Thus, advantageously, the DPU and motor controller are an integrated unit, such as for example a frequency converter.

In an embodiment of the disclosure, the DPU and the motor controller are an integrated unit.

Any type of motor and motor controller may be used. However certain combinations of motors and motor controllers may result in a more precise and controlled regulation. Advantageously, the motor is an electric motor, where examples of electric motors include DC and AC motors. For example, the motor is advantageously a brushless DC motor (BLDC) with associated controller and drive, such as a voltage control drive, where motor speed and/or torque are controlled by varying the motor voltage by means of a pulse with modulation (PWM). Alternatively, the motor may be a permanent magnet AC motor (PMAC) with associated controller and drive, such as a frequency control drive, where the motor speed and/or torque are controlled by varying the motor frequency and motor voltage by means of pulse with modulation (PWM).

User Input

To improve user friendliness and user safety, the DPU is advantageously configured for receiving user input via a communication device, such as a wireless device. For example, if the communication device is a mobile phone, the DPU may receive the input wireless by a near field coupling receiver, a Bluetooth receiver, and/or an antenna configured for receiving signals via wireless internet or signal with frequencies as transmitted by mobile phones. Examples of wireless devices include a tablet, a smart phone, a laptop, or a device configured with near field coupling or Bluetooth.

In an embodiment of the disclosure, the user input is received via a communication device. In a further embodiment, the communication device is a wireless device, such as a tablet, a smart phone, a laptop, or a device configured with near field coupling or Bluetooth.

To further improve user friendliness, the safety and reduce the risk of human errors, the user input may be obtained via a tag reader configured for reading a tag associated with the pump capacity and/or the lubrication target, or a scanning device configured for reading a label associated with the pump capacity and/or the lubrication target. The tag/label is advantageously located at or adjacent to the mobile pump and/or lubrication target.

In an embodiment of the disclosure, the user input is obtained via a scanning device configured for reading a label associated with the pump capacity and/or lubrication target.

To improve the cost efficiency of the mobile pump, the mobile pump advantageously comprises as few parts as possible. Thus, advantageously the user input is received manually, e.g. via a panel or a potentiometer.

In an embodiment of the disclosure, the user input is received manually, such as via a panel or a potentiometer.

Pressure Monitor

The pump pressure may be monitored with different means. Advantageously, the pressure monitor is placed adjacent to the lubricant dispenser, such that the measured pump pressure is precise and approximately the pressure experienced by the lubricant target. Hence, the pressure monitor may be a pressure sensor or pressure gauge placed in the open circuit between the lubricant container and lubricant dispenser.

Alternatively and to improve the cost efficiency of the mobile pump, the pump pressure may be derived from the pump operation parameters. For example, for a pump driven by an electrical motor, the motor current is directly related to the pump pressure.

In an embodiment of the disclosure, the pressure monitor is placed in an open circuit. In a further embodiment, the pressure monitor is a pressure sensor. In a further embodiment, the pressure monitor is a pressure-derived pump parameter.

Pump

Since the DPU and motor controller determine the desired target motor speed and regulate the motor speed based on the measured pressure, it follows that a more efficient pump operation and motor regulation is obtained for pumps providing smooth pressure profiles. Examples of pumps with a smooth pressure profile include gear pump, and rotating piston pump. In contrast to these, a piston pump will have a pressure profile with peaks, where peaks occur following each push.

In an embodiment of the disclosure, the pump is selected from the group of: piston pump, gear pump, and rotating piston pump. In a further embodiment, the pump is selected with the proviso that the pump is not a piston pump.

Use of the Mobile Pump

To improve the flexibility and mobility of the mobile pump, the pump advantageously comprises a power supply, such as a battery, for powering the motor, motor controller, and/or the DPU.

In an embodiment of the disclosure, the pump further comprises a power supply, such as a battery.

Advantageously, the data processing unit comprises a computer implemented method for regulating the pump pressure of the mobile lubrication pump. Alternatively, the data processing unit comprises a software application executable on a remote device.

A computer implemented method for regulating the pump pressure of a mobile lubrication pump, comprising the steps of:

providing a mobile lubrication pump comprising a motor,
providing at least one condition parameter via a communication device, wherein the condition parameter is related to: pump type, lubrication target, pump pressure, pump speed, and/or pump flow rate,
measuring the pump pressure,
determining and regulating the speed of the motor based on the input in b) and c).

EXAMPLES

The invention is further described by the examples provided below.

Example 1

Mobile Lubrication Pump with Integrated User Interface

Figure 2A:
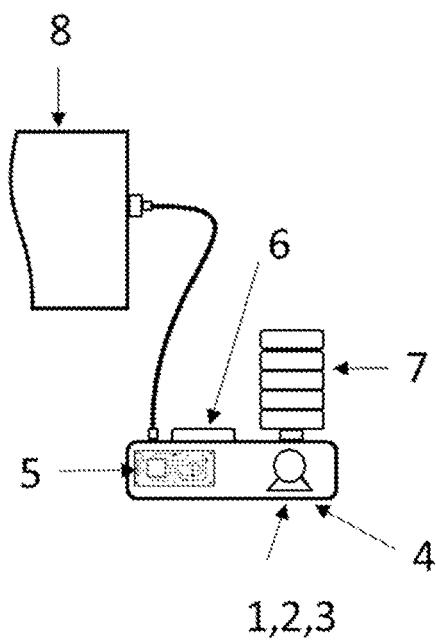
FIGS. 2A and 2B show embodiments of a mobile lubrication pump according to the present disclosure, where the pump and user interface form an integrated unit.

FIG. 2A shows an embodiment of a mobile lubrication pump or dispensing station according to the present disclosure for dispensing a lubricant or grease from a container 7 to a lubrication target 8. The system comprises a pump 1 connected to a motor 2 for driving the pump, and where the motor operation is regulated by a motor controller 3. The pump, motor, and motor controller are exemplified as an integrated unit. The pump further comprises a pressure monitor 4 for measuring the pump pressure via a pressure-derived pump parameter, such as the electrical current flowing in the pump motor.

The system further comprises a data processing unit (DPU) 5 for communicating with the motor controller and for receiving input from the pressure monitor. The DPU is further configured for receiving a user input, e.g. via a user interface 6, such as a panel or a potentiometer, where the user input is related to the pump capacity and/or the lubrication target. For example, the user input may be related to the pump capacity, e.g. the target pump pressure, which is the considered maximum pump pressure for efficiently operating a certain pump type under any conditions. The target pump pressure may be indicated by a label on the pump.

To obtain a compact mobile pump with few components, the pump, motor, motor controller, pressure monitor, DPU and user interface are advantageously an integrated unit, as exemplified in FIG. 2A.

Different lubrication targets require different amounts of grease to ensure sufficient lubrication. Also, different lubrication targets generate different back pressures and back pressure rates. Hence a first bearing may require and tolerate a high lubricant pressure for efficient lubrication, and correspondingly generate a high back pressure, whereas a second bearing may only tolerate a low lubricant pressure for efficient lubrication. To ensure efficient and safe lubrication of a target, the target may be labelled with information on the allowable lubrication conditions, e.g. the maximum allowable lubrication pressure.

Different pumps will have different pump capacity, i.e. different target capacity or optimum capacity, where it operates most efficiently for producing a pump pressure for dispensing a lubricant. To ensure efficient and safe operation of a pump, the pump is typically labelled with a pump capacity based on the pump type, as described above.

When using the mobile lubrication pump according to the present disclosure, the mobile pump is first transferred to the vicinity of a lubrication target. At the lubrication target, the reader may receive the information related to the lubrication target, as well as the pump capacity. The user then communicates the input related to the pump capacity and/or lubrication target to the DPU, e.g. via a potentiometer user interface.

During operation of the pump, any changes of the pump pressure will be monitored by the pressure monitor. For example, the pressure may gradually increase due to an increasing back pressure. The pressure monitor communicates the monitored pressure to the DPU, and based on the actual measured pressure and the input related to the pump capacity and/or lubrication target, the DPU can calculate or determine the motor speed and/or torque, which will regulate the pump pressure.

For example, if the measured pump pressure is higher than the pump capacity and/or lubrication target allows based on the input from the user, the calculated motor speed and/or torque will be reduced, such that the pump pressure is regulated to be reduced. On the other hand, if the measured pump pressure is lower than the pump capacity and/or lubrication target allows based on the input from the user, the calculated motor speed and/or torque will be increased, such that the pump pressure is regulated to be increased. Hence, the DPU calculates and determines a desired motor speed and/or torque, which is different from zero.

The determined desired motor speed and/or torque is communicated from the DPU to the motor controller. The communication may be continuous or discontinuous. Similarly, the motor controller and motor regulation may be continuous or discontinuous. Preferably, the motor is operated discontinuously by stopping the motor for a predetermined amount of time before the desired target motor speed and/or torque is set and the motor restarted at the new set speed.

It was found that a more efficient lubrication process may be obtained if the pump operation is regulated based on the measured pump pressure relative to a given pump capacity and/or lubrication target.

Figure 2B:
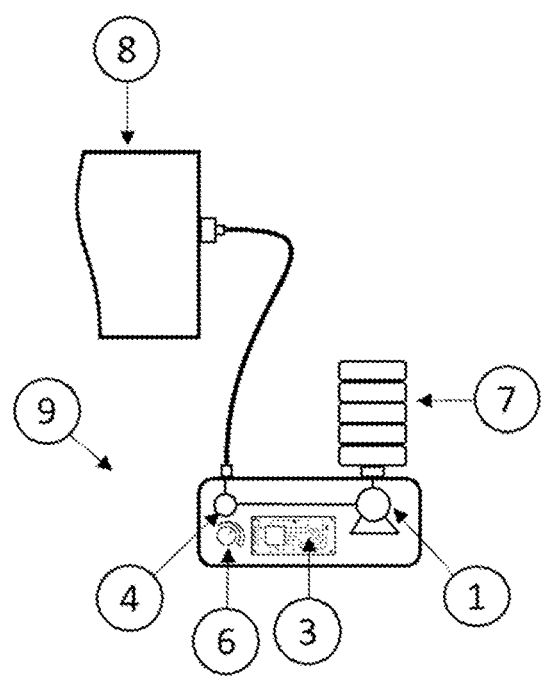

FIG. 2B shows another and further embodiment of a mobile lubrication pump or dispensing station 9 according to the present disclosure for dispensing lubricant from a grease container 7 to a lubrication target 8. The system comprises a pump 1 connected to a motor (not shown) for driving the pump, and where the motor operation is regulated by a motor controller 3.

The motor controller 3 may be a digital controller with data processing unit (DPU) or analog controller, The controller is configured for communicating with the motor controller and for receiving input from the pressure monitor 4, which measures the pump pressure via a pressure sensor/gauge, or via a pressure-derived pump parameter, such as the electrical current flowing in the pump motor. The DPU is further configured for receiving a user input, e.g. via a user interface 6, such as a potentiometer, buttons, or a touch display, where the user input is related to the pump capacity and/or the lubrication target.

Example 2

Mobile Lubrication Pump with Communication Device

Figure 3A:
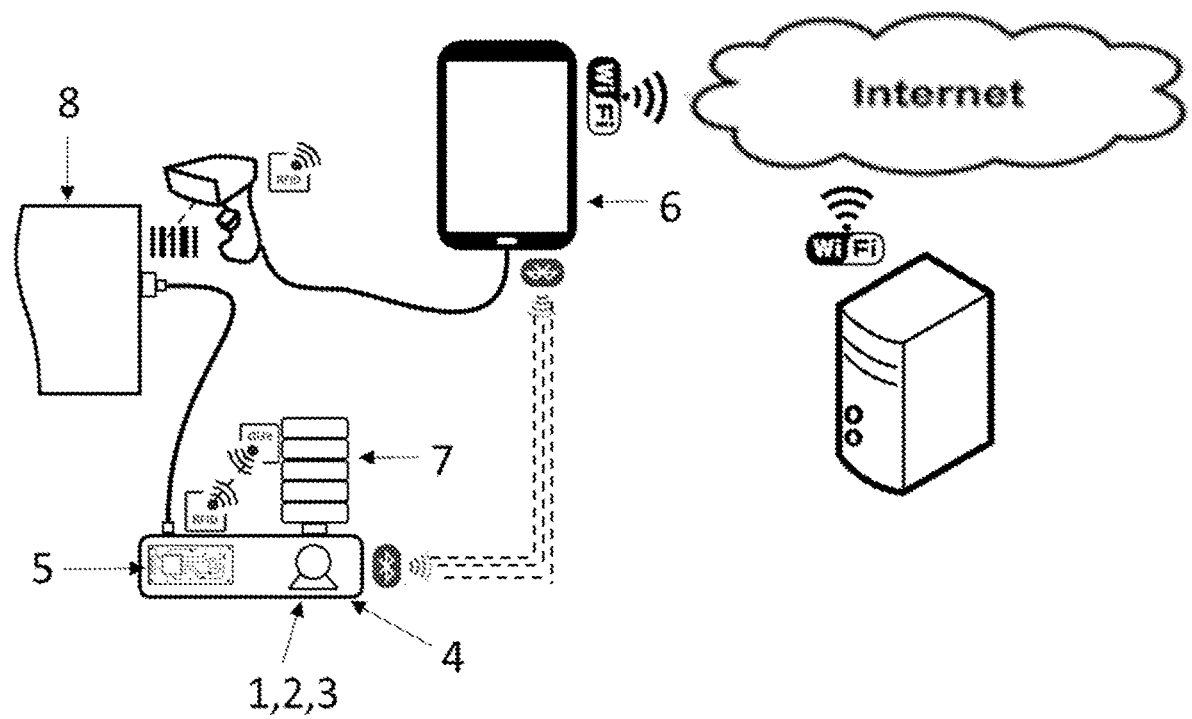
FIGS. 3A and 3B show embodiments of a mobile lubrication pump according to the present disclosure, where the user interface includes a wireless communication device, and where the DPU optionally comprises computer implementation.

FIG. 3A shows an embodiment of a mobile lubrication pump according to the present disclosure, where the user interface includes a wireless communication device, and where the DPU optionally comprises computer implementation. FIG. 3A shows a mobile lubrication pump for dispensing a lubricant or grease from a container 7 to a lubrication target 8. The system comprises a pump 1 connected to a motor 2 for driving the pump, and where the motor operation is regulated by a motor controller 3. The pump, motor, and motor controller are exemplified as an integrated unit. The pump further comprises a pressure monitor 4 for measuring the pump pressure via a pressure-derived pump parameter, such as the electrical current flowing in the pump motor.

The system further comprises a data processing unit (DPU) 5 for communicating with the motor controller and for receiving input from the pressure monitor. The DPU is further configured for receiving a user input, e.g. via a user interface 6, such as a communication device. Advantageously, the communication device is a wireless device, such as a tablet, a smart phone, or a laptop as illustrated in FIG. 3A. The communication device may receive input from the user, by manual input, and/or via a tag reader configured for reading a label or RFID associated with the pump capacity and/or lubrication site. For example, the tag reader may be a scanning device or RFID reader as illustrated in FIG. 3A.

The DPU advantageously receives the input from the communication device via a near field coupling receiver, a Bluetooth receiver, and/or an antenna configured for receiving signals via wireless internet or signal with frequencies as transmitted by mobile phones.

In addition, the DPU and the communication device may be configured to transmit the received input to computer, and advantageously the transmission is wirelessly, as illustrated in FIG. 3A.

Different lubrication targets require different amounts of grease to ensure sufficient lubrication. Also, different lubrication targets generate different back pressures and back pressure rates. Hence a first bearing may require and tolerate a high lubricant pressure for efficient lubrication, and correspondingly generate a high back pressure, whereas a second bearing may only tolerate a low lubricant pressure for efficient lubrication. To ensure efficient and safe lubrication of a target, the target may be labelled with information on the allowable lubrication conditions, e.g. the maximum allowable lubrication pressure.

Different pumps will have different pump capacity, i.e. different target capacity or optimum capacity, where it operates most efficiently for producing a pump pressure for dispensing a lubricant. To ensure efficient and safe operation of a pump, the pump is typically labelled with a pump capacity based on the pump type, as described above.

When using the mobile lubrication pump according to the present disclosure, the mobile pump is first transferred to the vicinity of a lubrication target. At the lubrication target, the communication device receives the information related to the lubrication target, as well as the pump capacity, e.g. by the user scanning labels/RFID associated with the pump and/or target.

During operation of the pump, any changes of the pump pressure will be monitored by the pressure monitor. For example, the pressure may gradually increase due to an increasing back pressure. The pressure monitor communicates the monitored pressure to the DPU, and based on the actual measured pressure and the input related to the pump capacity and/or lubrication target, the DPU can calculate or determine the motor speed and/or torque, which will regulate the pump pressure.

For example, if the measured pump pressure is higher than the pump capacity and/or lubrication target allows based on the input from the user, the calculated motor speed and/or torque will be reduced, such that the pump pressure is regulated to be reduced. On the other hand, if the measured pump pressure is lower than the pump capacity and/or lubrication target allows based on the input from the user, the calculated motor speed and/or torque will be increased, such that the pump pressure is regulated to be increased. Hence, the DPU calculates and determines a desired motor speed and/or torque, which is different from zero.

The determined desired motor speed and/or torque is communicated from the DPU to the motor controller. The communication may be continuous or discontinuous. Similarly, the motor controller and motor regulation may be continuous or discontinuous. Preferably, the motor is operated discontinuously by stopping the motor for a predetermined amount of time before the desired target motor speed and/or torque is set and the motor restarted at the new set speed.

The desired motor speed and/or torque may be calculated and determined directly by the DPU. In addition, or alternatively, the calculation may be carried out on a computer in communication with the DPU and/or the communication device, as illustrated in FIG. 3A.

It was found that a more efficient lubrication process may be obtained if the pump operation is regulated based on the measured pump pressure relative to a given pump capacity and/or lubrication target.

Figure 3B:
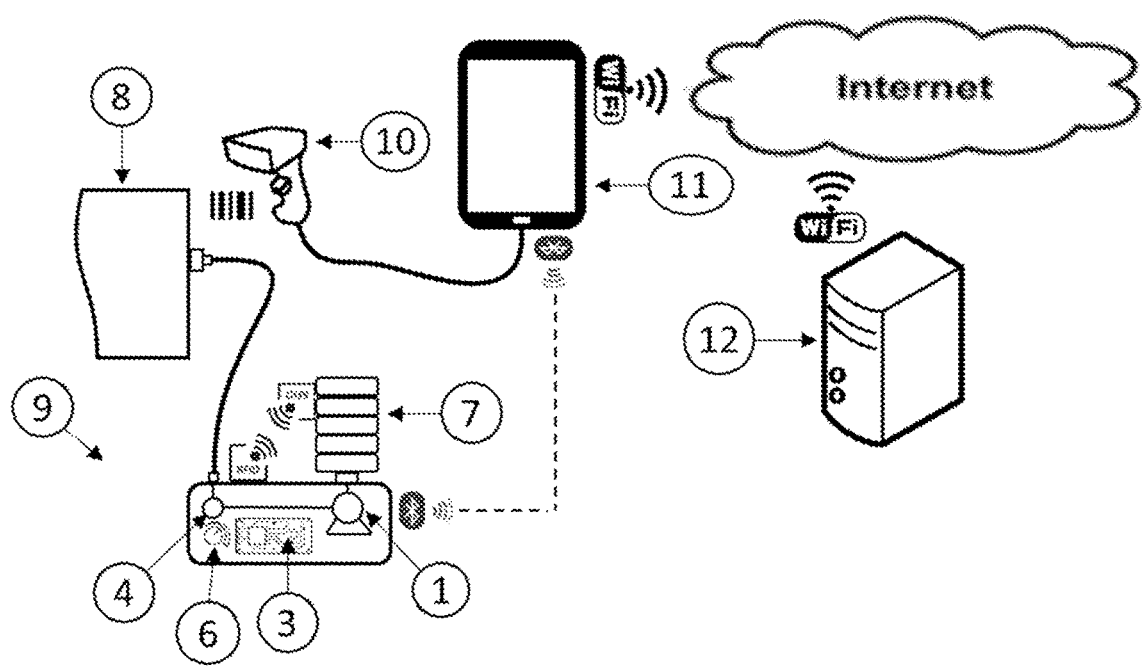

FIG. 3B shows another and further embodiment of a mobile lubrication pump according to the present disclosure, where the user interface includes a wireless communication device, and where the DPU optionally comprises computer implementation. FIG. 3A shows a mobile lubrication pump or dispensing station 9 for dispensing a lubricant or grease from a container 7 to a lubrication target 8. The system comprises a pump 1 connected to a motor (not shown) for driving the pump, and where the motor operation is regulated by a motor controller 3, which may be a controller with data processing unit (DPU) or an analog controller, and which is configured for communicating with the motor controller and for receiving input from the pressure monitor 4, which measuring the pump pressure via a pressure sensor/gauge or a pressure-derived pump parameter, such as the electrical current flowing in the pump motor. The controller is further configured for receiving a user input, e.g. via a user interface 6, which may be a simple potentiometer, buttons, touch display, and/or a communication device 11, e.g. a wireless device, such as a tablet, a smart phone, or a laptop as illustrated in FIG. 3B. The communication device may receive input from the user, by manual input, and/or via a tag reader configured for reading a label or RFID associated with the pump capacity and/or lubrication site. For example, the tag reader may be a scanning device or RFID reader, e.g. a bar code reader 10 as illustrated in FIG. 3B. The controller advantageously receives the input from the communication device via a near field coupling receiver, a Bluetooth receiver, and/or an antenna configured for receiving signals via wireless internet or signal with frequencies as transmitted by mobile phones. In addition, the controller and the communication device may be configured to transmit the received input to a computer e.g. via an internet server 12, and advantageously the transmission is wirelessly, as illustrated in FIG. 3B.

REFERENCE NUMBERS

1—Pump
2—Motor
3—Motor controller

4—Pressure monitor
5—Data processing unit (DPU)
6—User interface
7—Container
8—Lubrication target
9—Dispensing station
10—Bar code reader
11—Communication device
12—Internet server or laptop

The invention claimed is:

1. A mobile lubrication pump, comprising:
 a motor for driving the pump for producing a pump pressure;
 a pressure monitor for measuring the pump pressure;
 a motor controller for regulating the operation of the motor;
 a data processing unit (DPU) for communicating with the motor controller, and for receiving: 1) input from the pressure monitor, and 2) user input related to: a maximum lubrication pressure of a lubrication target; and
 wherein the data processing unit is configured to determine and communicate a motor speed and/or motor torque to the motor controller based on the received input 1) and 2).

2. The pump according to claim 1, wherein the user input is further related to a target pump pressure of the pump.

3. The pump according to claim 1, wherein the DPU is configured for continuously receiving input from the pressure monitor.

4. The pump according to claim 1, wherein the DPU is configured for minimising the difference between input 1) and 2).

5. The pump according to claim 4, wherein the DPU is configured for minimising the difference in a closed feedback loop.

6. The pump according to claim 1, wherein the motor controller is configured for regulating the operation of the motor continuously.

7. The pump according to claim 1, wherein the motor controller is configured for regulating the operation of the motor discontinuously.

8. The pump according to claim 1, wherein the DPU and the motor controller are an integrated unit.

9. The pump according to claim 1, wherein the user input is received via a communication device.

10. The pump according to claim 9, wherein the communication device is a wireless device.

11. The pump according to claim 10, wherein the communication device is a tablet or a smart phone or a laptop.

12. The pump according to claim 10, wherein the communication device is a device configured with near field coupling or Bluetooth.

13. The pump according to claim 1, wherein the user input is obtained via a scanning device configured for reading a label associated with the pump capacity and/or lubrication target.

14. The pump according claim 1, wherein the user input is received manually.

15. The pump according to claim 14, wherein the user input is received via a panel or a potentiometer.

16. The pump according to claim 1, wherein the pressure monitor is placed in an open circuit.

17. The pump according to claim 1, wherein the pressure monitor is a pressure sensor.

18. The pump according to claim 1, wherein the pressure monitor is a pressure-derived pump parameter.

19. The pump according to claim 1, wherein the motor is an electric motor.

20. The pump according to claim 1, further comprising a power supply.

21. The pump according to claim 1, wherein the pump is selected from the group of: piston pump, gear pump, and rotating piston pump.

22. The pump according to claim 1, with the proviso that the pump is not a piston pump.

23. A method for regulating the pump pressure of a mobile lubrication pump, comprising the steps of:
 a) providing a mobile lubrication pump comprising a pump, a motor, and a pressure monitor;
 b) providing at least one condition parameter via a communication device, wherein the condition parameter is related to: a maximum lubrication pressure of a lubrication target;
 c) measuring the pump pressure;
 d) determining and regulating the speed and/or torque of the motor based on the input in b) and c).

24. The method according to claim 23, wherein the method is computer implemented.

25. The method according to claim 23, wherein the condition parameter is further related to a target pump pressure of the pump.

* * * * *